US012753581B2

(12) United States Patent
Lee et al.

(10) Patent No.: US 12,753,581 B2
(45) Date of Patent: Oct. 6, 2026

(54) SYSTEM AND METHOD FOR CONTROLLING CONSTRUCTION MACHINERY

(71) Applicants: HD CONSTRUCTION EQUIPMENT CO., LTD., Seongnam-si (KR); WISE AUTOMOTIVE CORPORATION, Seoul (KR)

(72) Inventors: Sanghoon Lee, Yongin-si (KR); Joonyong Jung, Seoul (KR); Jae Hong Park, Seoul (KR); Jung Pyo Lee, Seoul (KR)

(73) Assignees: HD CONSTRUCTION EQUIPMENT CO., LTD., Seongnam-si (KR); WISE AUTOMOTIVE CORPORATION, Seoul (KR)

( * ) Notice: Subject to any disclaimer, the term of this patent is extended or adjusted under 35 U.S.C. 154(b) by 0 days.

(21) Appl. No.: 19/122,334

(22) PCT Filed: Oct. 20, 2023

(86) PCT No.: PCT/KR2023/016422
§ 371 (c)(1),
(2) Date: Apr. 18, 2025

(87) PCT Pub. No.: WO2024/085732
PCT Pub. Date: Apr. 25, 2024

(65) Prior Publication Data

US 2026/0152927 A1 Jun. 4, 2026

(30) Foreign Application Priority Data

Oct. 21, 2022 (KR) ........................ 10-2022-0136703

(51) Int. Cl.
*E02F 9/26* (2006.01)
*E02F 9/24* (2006.01)
*H04N 5/265* (2006.01)

(52) U.S. Cl.
CPC .................. *E02F 9/26* (2013.01); *E02F 9/24* (2013.01); *H04N 5/265* (2013.01)

(58) Field of Classification Search
CPC ............... E02F 9/24; E02F 9/26; H04N 5/265
(Continued)

(56) References Cited

U.S. PATENT DOCUMENTS

| | | | | |
|---|---|---|---|---|
| 4,868,752 A * | 9/1989 | Fujii | G05D 1/0246 | 701/28 |
| 11,659,788 B2 * | 5/2023 | Puryk | A01D 41/127 | 414/467 |
| 2014/0297135 A1 * | 10/2014 | Larsson | B60T 7/22 | 701/50 |

(Continued)

FOREIGN PATENT DOCUMENTS

| | | | |
|---|---|---|---|
| JP | 5779244 B2 | 9/2015 |
| KR | 10-2019-0039250 A | 4/2019 |

(Continued)

OTHER PUBLICATIONS

Vimal Thilak, David G. Voelz, and Charles D. Creusere, "Polarization-based index of refraction and reflection angle estimation for remote sensing applications," 2007, Appl. Opt. 46, 7527-7536.*

(Continued)

*Primary Examiner* — Andrew R Dyer
(74) *Attorney, Agent, or Firm* — Hauptman Ham, LLP

(57) ABSTRACT

A control system for construction machinery includes an upper camera installed in a driver cabin of a rear body to capture a front view of the driver cabin, a lower camera installed in a front body rotatably connected to the rear body to capture a front view of the front body, a steering angle determiner configured to recognize a shape of the front body
(Continued)

in the first image captured from the upper camera and to determine a refraction angle of the front body, an image processor configured to synthesize the first and second images into one synthesized image, and to set a position of a transparency processing area in which at least one of the first and second images is transparency-processed in the synthesized image according to the refraction angle of the front body, and a display device configured to display the synthesized image transparency-processed by the image processing device.

18 Claims, 10 Drawing Sheets

(58) Field of Classification Search
USPC .............................................................. 701/50
See application file for complete search history.

(56) References Cited

U.S. PATENT DOCUMENTS

2016/0138248 A1* 5/2016 Conway .................. E02F 9/261 701/34.2
2019/0253641 A1 8/2019 Matsuda et al.
2020/0063401 A1* 2/2020 Sherlock ................. E02F 9/262
2021/0206330 A1* 7/2021 Lee .......................... G06T 11/00
2021/0223400 A1* 7/2021 Park ....................... B60W 40/02
2024/0202533 A1* 6/2024 Perincherry ............. G06N 3/09

FOREIGN PATENT DOCUMENTS

KR 10-2021-0000593 A 1/2021
KR 10-2021-0089039 A 7/2021
KR 10-2022-0102804 A 7/2022

OTHER PUBLICATIONS

J. C. Halimeh and M. Roser, "Raindrop detection on car windshields using geometric-photometric environment construction and intensity-based correlation," 2009 IEEE Intelligent Vehicles Symposium, Xi'an, China, 2009, pp. 610-615, doi: 10.1109/IVS.2009.5164347.*
International Search Report issued on Jan. 30, 2024 for corresponding International Patent Application No. PCT/KR2023/016422, along with English translation (5 pages).

* cited by examiner

SYSTEM AND METHOD FOR CONTROLLING CONSTRUCTION MACHINERY

CROSS-REFERENCE TO RELATED APPLICATION

This application is a National Stage application under 35 U.S.C. § 371 of International Application No. PCT/KR2023/016422, filed on Oct. 20, 2023, which claims the benefit of Korean Patent Applications No. 10-2022-0136703, filed on Oct. 21, 2022. The disclosures of the prior applications are incorporated by reference in their entireties.

TECHNICAL FIELD

The present invention relates to a control system and method for construction machinery. More particularly, the present invention relates to a control system for recognizing forward obstacles when working or driving construction machinery such as a wheel loader, an excavator, etc., and a method of controlling the construction machinery using the same.

BACKGROUND ART

In general, construction machinery such as a wheel loader, an excavator, etc., is widely used to excavate sand, gravel, and the like and load it into a dump truck. These works may be performed by driving a work apparatus installed in the construction machinery such as a bucket and a boom. However, the work apparatus may obstruct or limit an operator's front view while working or driving, and thus, obstruction of the operator's front view by the work apparatus may cause a safety accident.

DISCLOSURE OF THE INVENTION

Problems to be Solved

An object of the present invention provides a control system for construction machinery capable of improving forward visibility limited by a work apparatus.

Anther object of the present invention provides a control method for construction machinery using the control system.

Means to Solve the Problems

According to example embodiments, a control system for construction machinery includes an upper camera installed in a driver cabin of a rear body to capture a front view of the driver cabin, a lower camera installed in a front body rotatably connected to the rear body to capture a front view of the front body, a steering angle determiner configured to recognize a shape of the front body in the first image captured from the upper camera and to determine a refraction angle of the front body, an image processor configured to synthesize the first and second images into one synthesized image, and to set a position of a transparency processing area in which at least one of the first and second images is transparency-processed in the synthesized image according to the refraction angle of the front body determined by the steering angle determiner, and a display device configured to display the synthesized image transparency-processed by the image processing device.

In example embodiments, the steering angle determiner may be configured to recognize a shape of an attachment of the front body in the first image through a pre-determined algorithm and to calculate a steering hinge angle of the front body.

In example embodiments, the steering angle determiner may be configured to extract a shape of a boom of the front body from the first image through an edge algorithm, and to apply Hough Transform to the extracted shape of the boom to calculate the steering hinge angle of the front body.

In example embodiments, the image processor may be configured to crop a portion of the second image based on the first image and to synthesize the cropped image of the second image into the first image.

In example embodiments, the image processor may be configured to transparency-process a first region in the first image corresponding to the transparency processing area to have a first transparency, to determine a second region in the second image corresponding to the transparency processing area as a crop region, and transparency-process the determined second region to have a second transparency, and to synthesize the cropped image extracted from the second image into the first image.

In example embodiments, the first transparency and the second transparency may be set to be the same or different from each other.

In example embodiments, the image processor may be configured to set a portion of the first image as a first synthesizing region, set a portion of the second image as a second synthesizing region, process the second synthesizing region of the second image to be semi-transparent, and synthesize the semi-transparent second synthesizing region into the first synthesizing region of the first image to create the synthesized image.

In example embodiments, the control system for construction machinery may further include a work apparatus posture detection portion configured to detect a posture of a front work apparatus. The image processor may be configured to transparency-process at least one of the first and second images to be transparent in the transparency processing area according to the posture of the front work apparatus detected by the work apparatus posture detection portion.

In example embodiments, the image processor may be configured to transparency-process the first image to be transparent in the transparency processing area when at least a portion of the front working apparatus encroaches on a predetermined position, and to transparency-process the second image transparent in the transparency processing area when the front working apparatus does not encroach on the predetermined position.

In example embodiments, the control system for construction machinery may further include an input portion configured to set an image processing condition in the image processor.

In example embodiments, the image processing condition may include a transparency processing switching timing of the first and second images or an area occupied by the transparency processing area within the entire display area of the display device.

In example embodiments, the image processor may be configured to process an outline of an appearance of a boom or bucket that is captured and transparency-processed in the first image or the second image in the transparency processing area to be displayed as a line or a dotted line.

According to example embodiments, in a method of controlling construction machinery, a first image of the front of a driver cabin is obtained from an upper camera installed in the driver cabin of a rear body. A second image of the front of a front body is obtained from a lower camera installed in the front body rotatably connected to the rear body. A shape of the front body in the first image is recognized to determine a refraction angle of the front body. The first and second images are synthesized into one synthesized image. A position of a transparency processing area in the synthesized image is set according to the refraction angle of the front body. At least one of the first and second images is transparency-processed in the transparency processing area of the synthesized image. The transparency-processed image is displayed through a display device.

In example embodiments, recognizing the shape of the front body in the first image to determine the refraction angle of the front body may include recognizing a shape of an attachment of the front body in the first image through a pre-determined algorithm; and calculating a steering hinge angle of the front body from the recognized shape.

In example embodiments, recognizing the shape of the attachment of the front body in the first image through the pre-determined algorithm may include extracting a shape of a boom of the front body from the first image through an edge algorithm; and applying Hough Transform to the extracted shape of the boom to calculate the steering hinge angle of the front body.

In example embodiments, transparency-processing the at least one of the first and second images may include cropping a portion of the second image based on the first image and synthesizing the cropped image of the second image into the first image.

In example embodiments, transparency-processing the at least one of the first and second images may include transparency-processing a first region in the first image corresponding to the transparency processing area to have a first transparency: determining a second region in the second image corresponding to the transparency processing area as a crop region and transparency-processing the determined second region to have a second transparency; and synthesizing the cropped image extracted from the second image into the first image.

In example embodiments, the method may further include detecting a posture of a front work apparatus. Transparency-processing the at least one of the first and second images may include transparency-processing the at least one of the first and second images according to the detected posture of the front work apparatus.

In example embodiments, the method may further include setting an image processing condition to make the first and second images transparent.

In example embodiments, the image processing condition may include a transparency processing switching timing of the first and second images or an area occupied by the transparent processing area within the entire display area of the display device.

Effects of the Invention

According to example embodiments, a first image and a second image captured from an upper camera installed in a driver cabin of a wheel loader and a lower camera installed in a front body may be synthesized into one image, at least one of the first and second images may be transparency-processed to be transparent in a transparency processing area, and the transparency-processed image may be displayed through a display device.

In addition, when the wheel loader is steered, a steering hinge angle of the front body may be determined using only the camera image without a separate angle sensor or steering cylinder displacement sensor, and the image may be processed such that a position of the transparent processing area in the image synthesized by the first image and the second image is aligned with the determined steering hinge angle.

Accordingly, even when the wheel loader is steered, it may be possible to prevent the operator's front view from being blocked by a front work apparatus including a boom and a bucket. Thus, the operator's cognitive ability may be increased to secure stability, to thereby prevent safety accidents in advance.

However, the effect of the invention may not be limited thereto, and may be expanded without being deviated from the concept and the scope of the present invention.

BEST MODE FOR CARRYING OUT THE INVENTION

Figure 1:
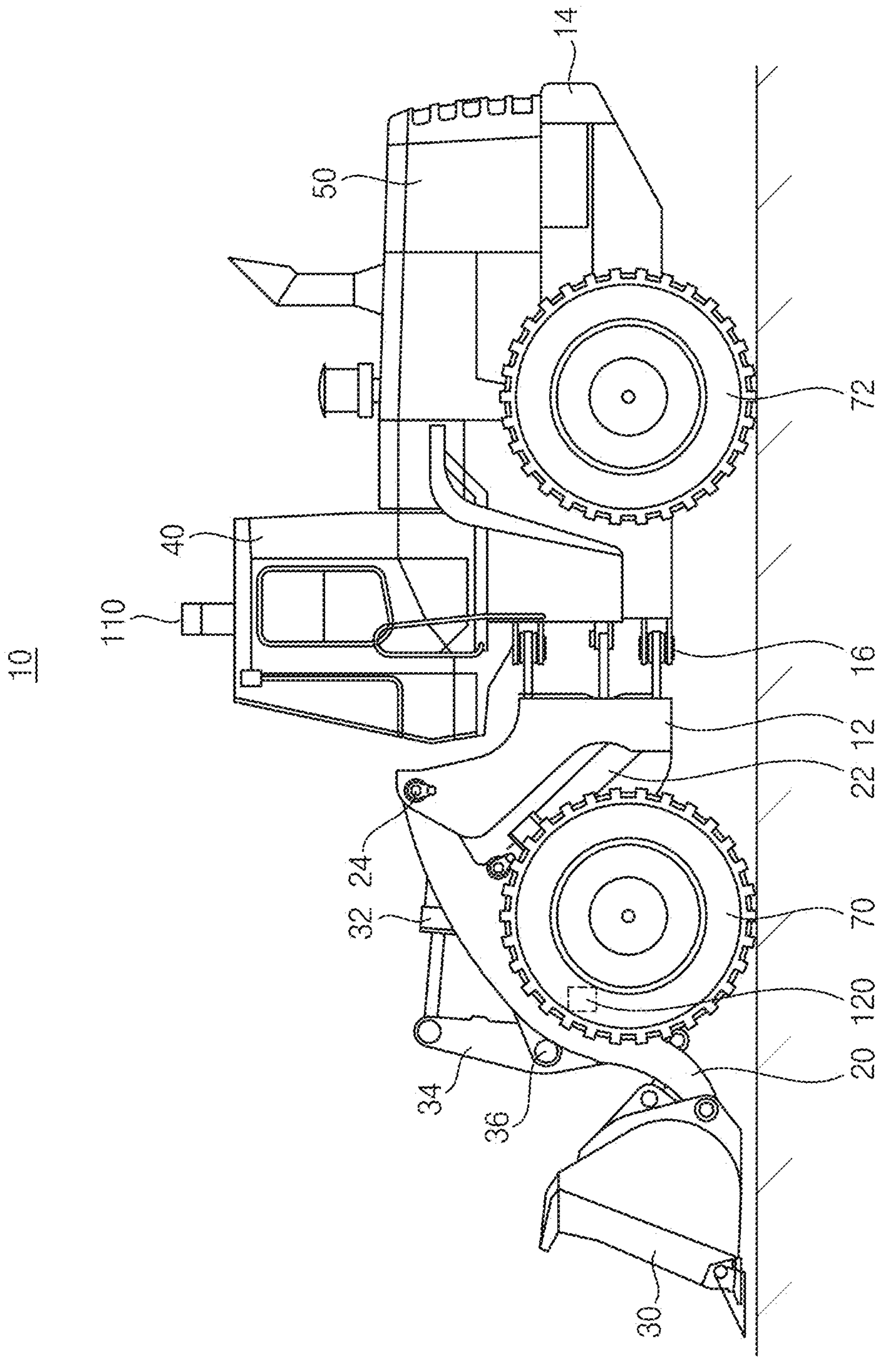
FIG. 1 is a side view illustrating construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a side view illustrating construction machinery in accordance with example embodiments. Although a wheel loader 10 is illustrated in FIG. 1, a control device of construction machinery according to example embodiments is not limited to being used only in the wheel loader, but may be applied to an industrial vehicle such as an excavator, a forklift, etc. Hereinafter, for convenience of description, only the wheel loader 10 will be described.

Referring to FIG. 1, construction machinery 10 may include a vehicle body 12, 14, a driver cabin 40, and a work apparatus. The vehicle body of the wheel loader 10 in FIG. 1 may include, for example, a front body 12 and a rear body 14 rotatably connected to each other. The front body 12 may include the work apparatus and a front wheel 70. The rear body 14 may include the driver cabin 40, an engine bay 50 and a rear wheel 72.

The work apparatus may include a boom 20 and a bucket 30. The boom 20 may be freely pivotally attached to the front body 12, and the bucket 30 may be freely pivotally attached to an end portion of the boom 20. The boom 20 may be coupled to the front body 12 by a pair of boom cylinders 22, and the boom 20 may be pivoted upwardly and downwardly by expansion and contraction of the boom cylinders 22. A tilt arm 34 may be freely rotatably supported on the boom 20, almost at its central portion. One end portion of the tilt arm 34 may be coupled to the front body 12 by a pair of bucket cylinders 32 and another end portion of the tilt arm 34 may be coupled to the bucket 30 by a tilt rod, so that the bucket 30 may pivot (crowd and dump) as the bucket cylinder 32 expands and contracts.

Additionally, the front body 12 and the rear body 14 may be rotatably connected to each other through a center pin 16 so that the front body 12 may swing side to side with respect to the rear body 14 by expansion and contraction of a steering cylinder (not illustrated).

A travel apparatus for driving the wheel loader 10 may be mounted in the rear body 14. An engine (not illustrated) may be provided in the engine bay to supply an output power to the travel apparatus. The travel apparatus may include a torque converter, a transmission, a propeller shaft, axles, etc. The output power of the engine may be transmitted to the front wheel 70 and the rear wheel 72 through the torque converter, the transmission, the propeller shaft and the axles, and thus the wheel loader 10 may travels.

A hydraulic pump (not illustrated) for supplying a pressurized hydraulic oil to the boom cylinder 22 and the bucket cylinder 32 of the work apparatus may be mounted at the rear body 14. The hydraulic pump may be driven using at least a portion of the power outputted from the engine. For example, the output power of the engine may drive the hydraulic pump for the work apparatus and a hydraulic pump for the steering cylinder via a power transmission device such as a gear train.

The hydraulic pump may supply the hydraulic oil to drive the work apparatus, and may be divided into a variable capacity type and a constant capacity type. A pump control device (EPOS, Electronic Power Optimizing System) may be connected to the variable capacity hydraulic pump, and an amount of the hydraulic oil discharged from the variable capacity hydraulic pump may be controlled by the pump control device. A main control valve (MCV) including a boom control valve and a bucket control valve may be installed on a hydraulic circuit connected to the hydraulic pump. The hydraulic oil discharged from the hydraulic pump may be supplied to the boom cylinder 22 and the bucket cylinder 32 through the boom control valve and the bucket control valve of the main control valve MCV. The main control valve (MCV) may supply the hydraulic oil discharged from the hydraulic pump to the boom cylinder 22 and the bucket cylinder 32 according to a pilot pressure signal in proportion to an operation rate of an operating lever. Thus, the boom 20 and the bucket 30 may be driven by the pressure of the hydraulic oil discharged from the hydraulic pump.

The driver cabin 40 may be installed on the vehicle body of the construction machinery, and in case of the wheel loader, the drive cabin 40 may be installed on the rear body 14. A maneuvering device may be provided within the driver cabin 40. The maneuvering device may include an acceleration pedal, a brake pedal, an FNR travel lever, the operating levers for operating the cylinders such as the boom cylinder 22 and the bucket cylinder 32, a steering device such as a steering wheel for actuating the steering cylinder, etc.

As mentioned above, the wheel loader 10 may include a traveling operating system for driving the travel apparatus via the power transmission device and a hydraulic operating system for driving the work apparatus such as the boom 20 and the bucket 30 using the output power of the engine 100.

Hereinafter, a control system for the construction machinery will be explained using the wheel loader as an example.

Figure 2:
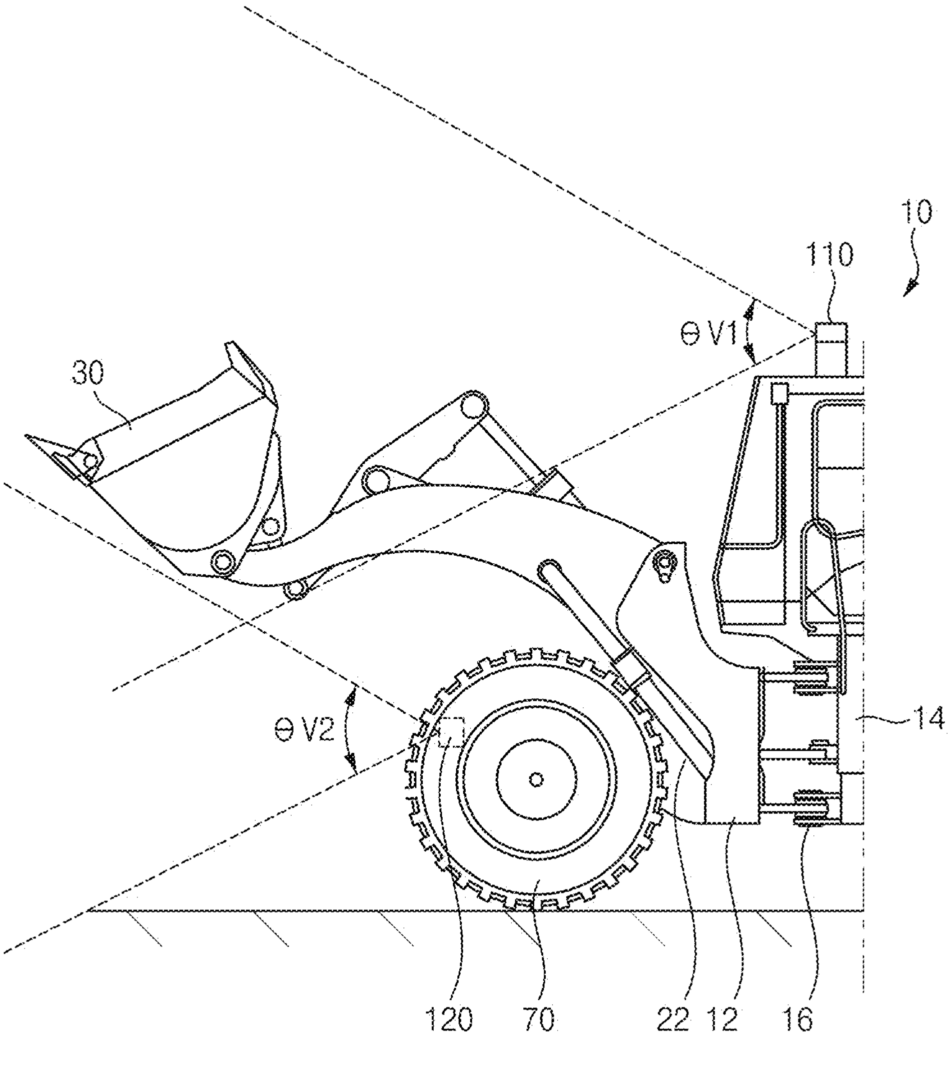
FIG. 2 is a side view illustrating vertical viewing angles of an upper camera and a lower camera at an elevation position of a bucket according to a rotational angle of the boom in FIG. 1.
Figure 3:
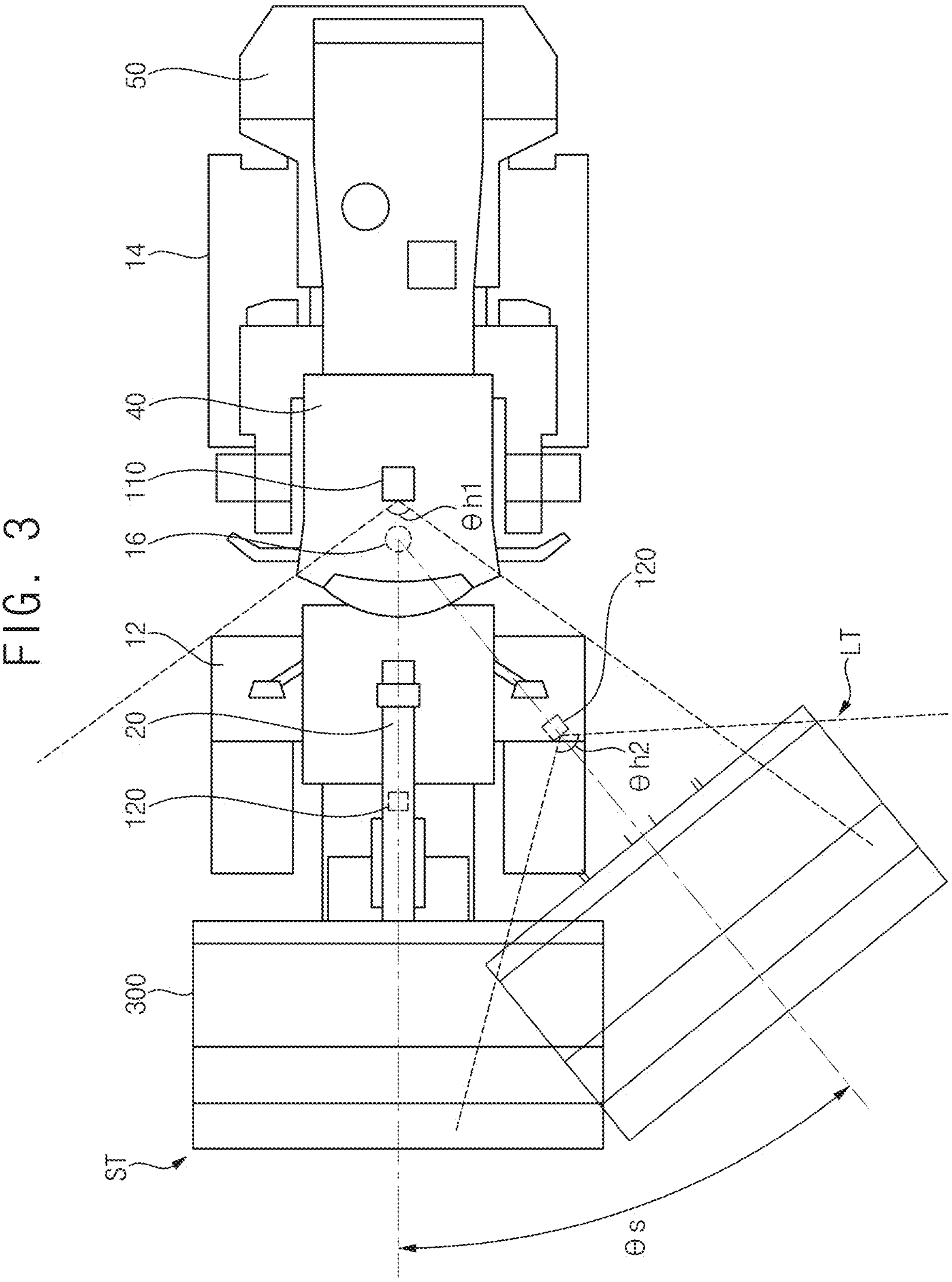
FIG. 3 is a plan view illustrating horizontal viewing angles of an upper camera and a lower camera when the construction machine of FIG. 1 travels straight ahead or turns left.
Figure 4:
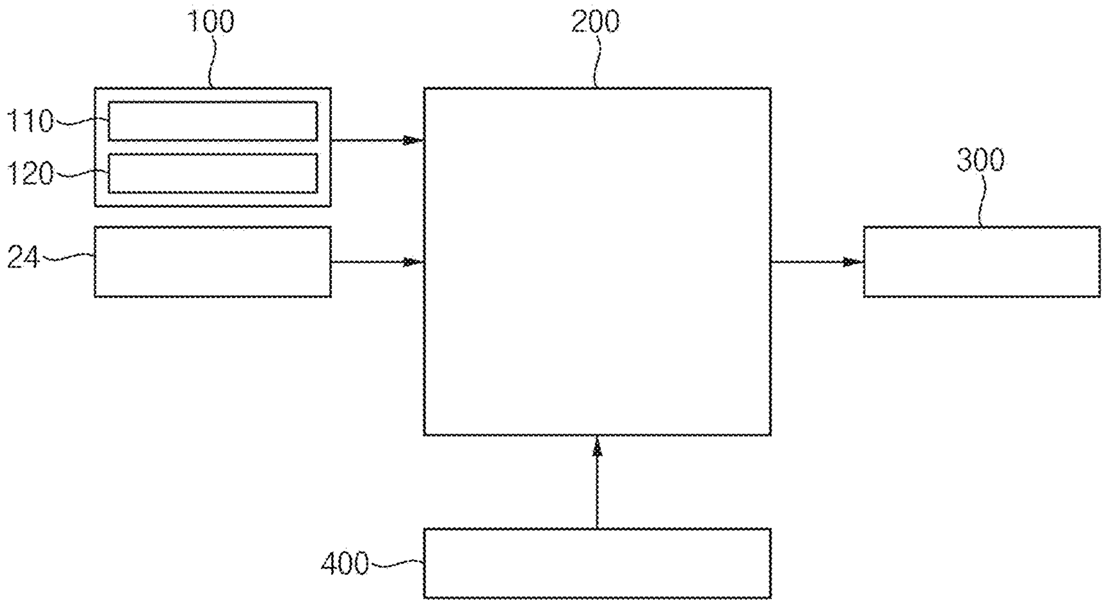
FIG. 4 is a block diagram illustrating a control system of the construction machine in FIG. 1.
Figure 5:
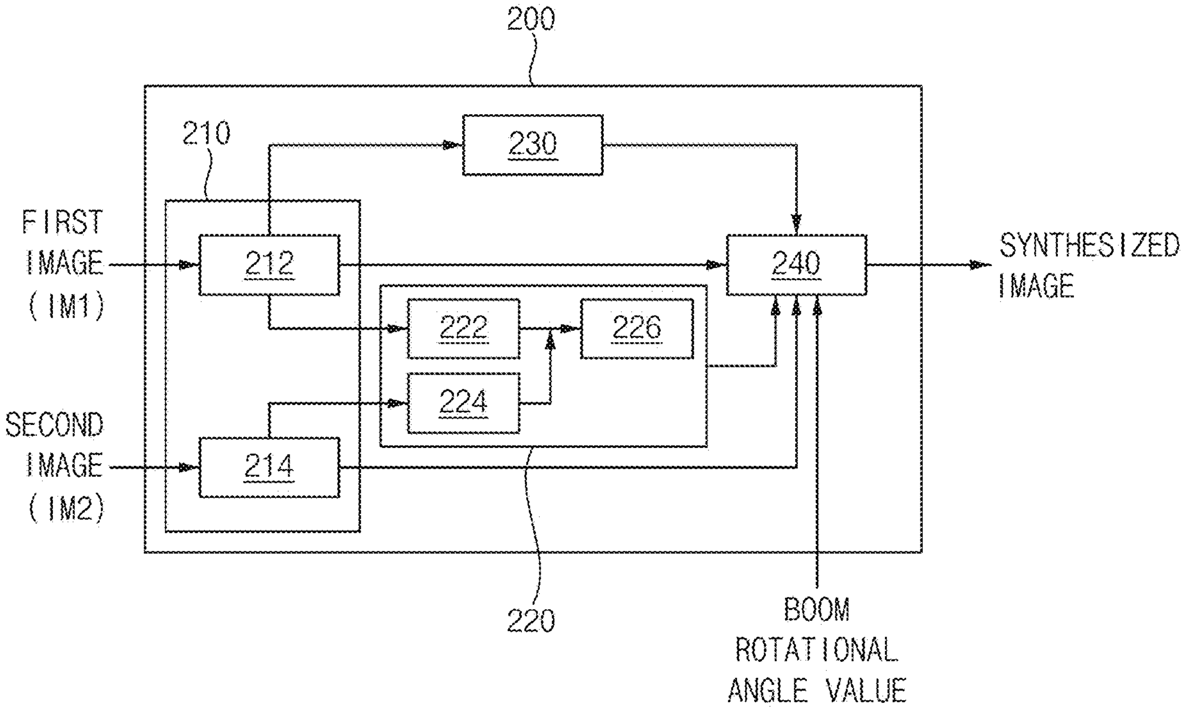
FIG. 5 is a block diagram illustrating an image processing device in FIG. 4.
Figure 6:
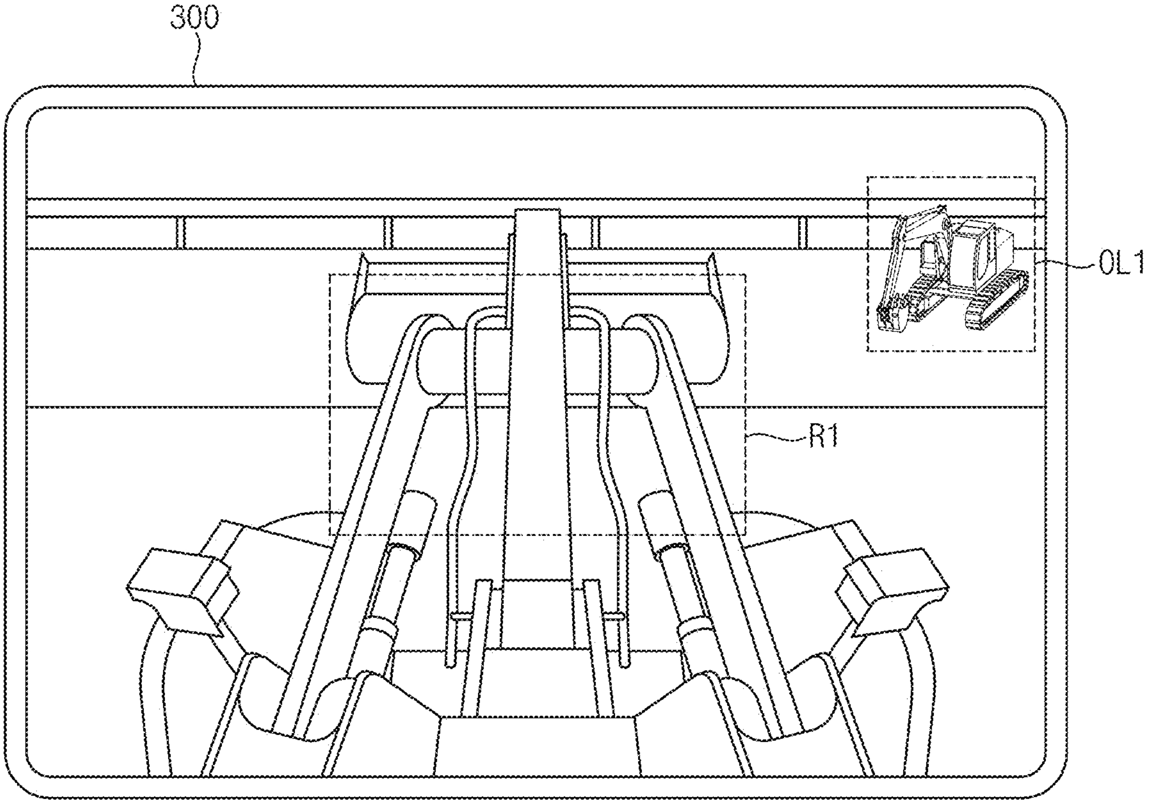
FIG. 6 is a view illustrating warning information of an object recognized from a first image captured through an upper camera by the image processing device of FIG. 5.
Figure 7:
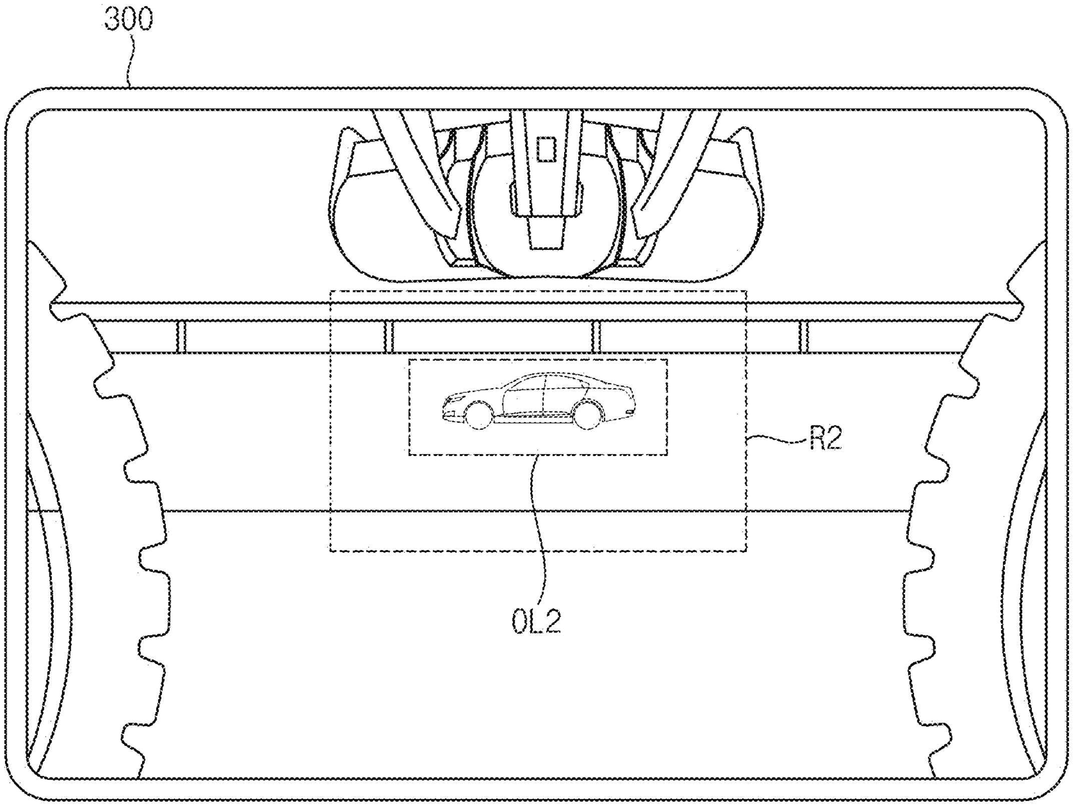
FIG. 7 is a view illustrating warning information of an object recognized from a second image captured through a lower camera by the image processing device of FIG. 5.
Figure 8:
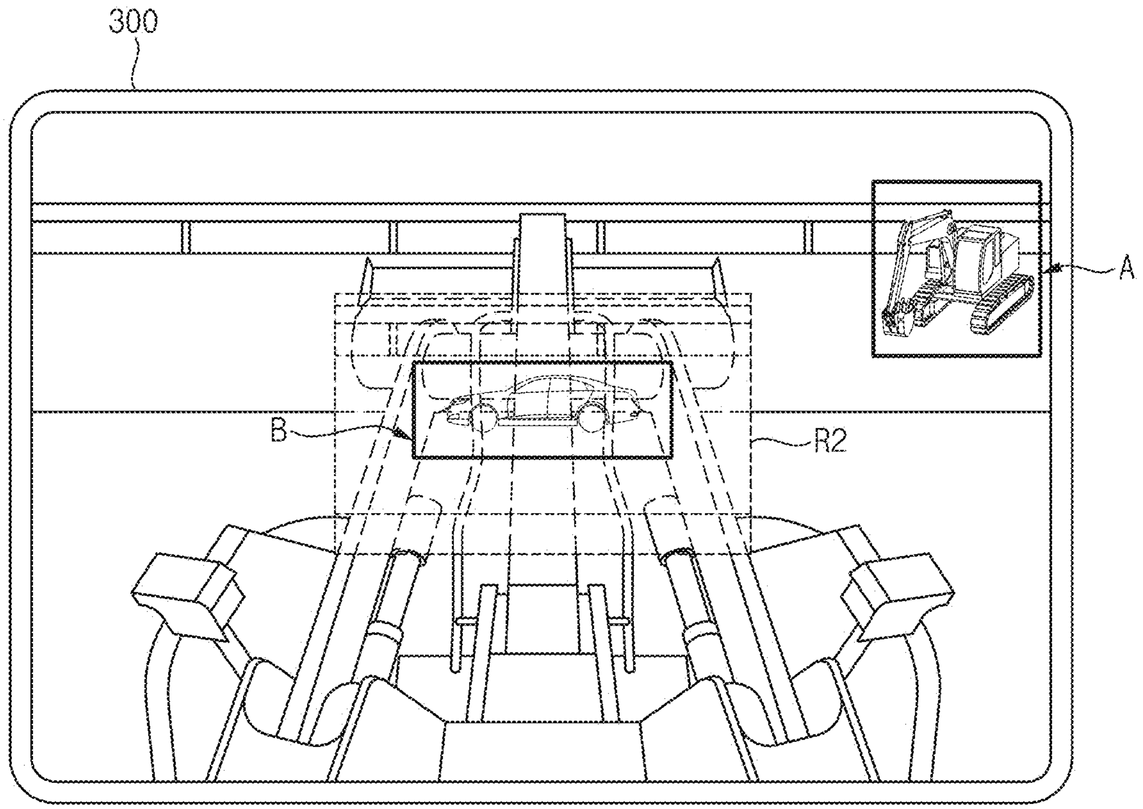
FIG. 8 is a view illustrating an image synthesized from the first image of FIG. 6 and the second image of FIG. 7 by the image processing device of FIG. 4.

FIG. 2 is a side view illustrating vertical viewing angles of an upper camera and a lower camera at an elevation position of a bucket according to a rotational angle of the boom in FIG. 1. FIG. 3 is a plan view illustrating horizontal viewing angles of an upper camera and a lower camera when the construction machine of FIG. 1 travels straight ahead or turns left. FIG. 4 is a block diagram illustrating a control system of the construction machine in FIG. 1. FIG. 5 is a block diagram illustrating an image processing device in FIG. 4. FIG. 6 is a view illustrating warning information of an object recognized from a first image captured through an upper camera by the image processing device of FIG. 5. FIG. 7 is a view illustrating warning information of an object recognized from a second image captured through a lower camera by the image processing device of FIG. 5. FIG. 8 is a view illustrating an image synthesized from the first image of FIG. 6 and the second image of FIG. 7 by the image processing device of FIG. 4.

Referring to FIGS. 1 to 8, a control system for a wheel loader may include a camera portion 100 installed in the wheel loader 10 to photograph the front of the wheel loader 10, an image processing device 200 configured to process an image from the camera portion 100 in real time, and a display device 300 configured to display the image processed by the image processing device 200. Additionally, the control system for the wheel loader may further include a work apparatus posture detection portion configured to detect a posture of the work apparatus connected to a front body 12 and an input portion 400 configured to set an image processing condition in the image processing device 200.

The image processing device 200 for the wheel loader 10 such as a portion of an engine control unit ECU or a vehicle control unit VCU, or a separate control unit may be mounted in the rear body 14. The image processing device 200 may be implemented with dedicated hardware, software, and circuitry configured to perform the functions described herein. These elements may be physically implemented by electronic circuits such as logic circuits, discrete components, microprocessors, hard-wired circuits, memory elements, wiring connections, and the like.

In example embodiments, the camera portion 100 may monitor the front of the wheel loader 10 when the wheel loader 10 travels or works, and may include a plurality of cameras. In particular, the camera portion 100 may include an upper camera 110 installed on the driver cabin 40 and configured to photograph the front of the driver cabin 40 to capture a first image IM1 and a lower camera 120 installed in the front body 12 and configured to photograph the front of the front body 12 to capture a second image IM2. For example, the upper camera and the lower camera may be fisheye cameras having fisheye lenses. Although one upper camera and one lower camera are illustrated in FIGS. 1 and 2, it may not be limited thereto, and a plurality of the upper cameras and a plurality of the lower cameras may be provided.

The upper camera 110 may have a first vertical viewing angle (Field of View, FoV) θv1 and a first horizontal viewing angle θh1 based on the front direction of the wheel loader. For example, the first vertical viewing angle and the first horizontal viewing angle may have an angular range of 60 degrees to 120 degrees. The lower camera 120 may have a second vertical viewing angle θv2 and a second horizontal viewing angle θh2. For example, the second vertical viewing angle and the second horizontal viewing angle may have an angular range of 60 degrees to 120 degrees.

The first image may be an image captured with a focus on a front upper region through the upper camera 110, and the second image may be an image captured with a focus on a front lower region through the second camera 120.

The first vertical viewing angle θv1 of the upper camera 110 and the second vertical viewing angle θv2 of the lower camera 120 may be set to partially overlap each other and the first horizontal viewing angle θh1 of the upper camera 110 and the second horizontal viewing angle θh2 of the lower camera 120 may be set to partially overlap each other, so that the first image and the second image may partially overlap each other.

In example embodiments, the upper camera 110 may be installed to coincide with a central axis (or pivotal axis) of the center pin 16 or be installed in the rear of the central axis, and the lower camera 120 may be installed in the front of the central axis of the center pin 16.

Since the upper camera 110 and the lower camera 120 are installed at different positions with respect to the pivotal central axis, as illustrated in FIG. 3, a direction in which the upper camera 110 looks and a direction in which the lower camera 120 looks may be changed to be different from each other when the wheel loader turns left (or right). As will be described later, the image processing device 200 may synthesize the first image IM1 and the second image IM2 into one image and may process the synthesized image such that a position of a transparency processing area in which at least one of the first and second images is transparency-processed is matched with a steering hinge angle θs of the wheel loader 10.

In example embodiments, the image processing device 200 may synthesize the first image IM1 captured from the upper camera 100 and the second image IM2 captured from the lower camera 120 into one synthesized image, and may recognize an object in the first image IM1 and the second image IM2, determine warning information of the recognized object, and perform transparency processing on at least one of the first image and the second image in the synthesized image and labeling processing on the warning information of the object. Additionally, the image processing device 200 may recognize a shape of the work apparatus 12 in the first image IM1 to determine the steering hinge angle θs of the front body 12 and determine a position of the transparency processing area R3 in which at least one of the first and second images in the synthesized image is processed to be transparent, according to the determined steering hinge angle.

As illustrated in FIG. 5, the image processing device 200 may include an image data receiver 210, an object recognizer 220, a steering angle determiner 230 and an image processor 240. The image processing device 200 may be installed in a form of a control device built into the control device or the display device of construction machine.

In particular, the image data receiver 210 may include a first data receiver 212 and a second data receiver 214. The first data receiver 212 may receive image data of the first image IM1 captured by the upper camera 110. The second data receiver 214 may receive image data of the second image IM2 captured by the lower camera 120.

The object recognizer 220 may include a first shape recognizer 222, a second shape recognizer 224, and a warning information determiner 226.

The first shape recognizer 222 may recognize an object based on first image data received from the first data receiver 212 and may determine a position of the object. The first shape recognizer 222 may recognize a person, construction machinery (excavator, wheel loader, etc.), an automobile, etc. as an object in the first image IM1 through a first algorithm determined in advance, and may output recognition data of the object. The recognition data may include data on the position of the object in an image coordinate system of the first image IM1.

The second shape recognizer 224 may recognize an object based on second image data received from the second data receiver 214 and may determine a location of the object. The second shape recognizer 224 may recognize a person, construction machinery (excavator, wheel loader, etc.), an automobile, etc. as an object in the second image IM2 through a second algorithm determined in advance, and may output recognition data on the position of the object in an image coordinate system of the second image IM2. The recognition data may include data on the position of the object in the image coordinate system of the second image IM2.

The first and second shape recognizers 222, 224 may compare an actual image in the first and second images with a learning image of the object stored in a storage portion of the image processing device 200, respectively, and if the actual image and the stored image of the object match each other, it may be recognized as the object. Here, the learning image of the object may include images stored by machine learning various shapes captured by the camera. Machine learning may be a field of artificial intelligence and may be referred to as an algorithm that allows a processing device such as a computer to learn.

The first and second shape recognizers 222, 224 may use the same learning model, but image data sets for learning in the first image and the second image may be different from each other. The first and second shape recognizers 222, 224 may determine the position of the object by identifying locations of pixels in the first image and the second image where the object is located, and may output the determined position data.

The warning information determiner 226 may determine warning information of the recognized object based on the recognition data of the object from the first and second shape recognizers 222, 224.

In particular, the warning information determiner 226 may label warning information to be displayed for the object, based on the position data of the object in the first image from the first shape recognizer 222. For example, the warning information determiner 226 may determine the warning information as a first label OL1 when the recognized object is positioned outside a first region R1 in the first image IM1 that corresponds to the transparency processing area.

The warning information determiner 226 may label warning information to be displayed for the object, based on the position data of the object in the second image from the second shape recognizer 224. The warning information determiner 226 may determine the warning information as a second label OL2 when the recognized object is positioned within a second region R2 in the second image IM2 that corresponds to the transparency processing area.

The steering angle determiner 230 may recognize the front body 12 as an object based on the first image data received from the first data receiver 212 to determine a position of the front body and determine the steering hinge angle θs of the front body 12 based on the determined position of the front body.

The steering angle determiner 230 may recognize a shape of an attachment (boom 20 or bucket 30) of the front body 12 in the first image IM1 through a pre-determined algorithm and may calculate the steering hinge angle of the front body.

For example, the steering angle determiner 230 may utilize Hough Transform. The shape of the boom 20 of the front body 12 may be extracted from the first image IM1 through an edge algorithm, and the Hough Transform may be applied to the extracted shape of the boom to recognize an intersection angle of lines extending from a center portion, a left edge, and a right edge of the boom 20, and the steering hinge angle of the front body may be calculated from the recognized intersection angle.

The image processor 240 may synthesize the first image IM1 and the second image IM2 from the first and second image data received from the image data receiver 210 into one image. The image processor 240 may match the first image and the second image captured by the upper camera 110 and the lower camera 120 to find portions of images that overlap in the first and second images and synthesize the overlapping portions of the images to one synthesized image. The image processor 240 may perform transparency processing on at least one of the first and second images in the synthesized image to be transparent in the transparency processing area R3. The transparency processing area R3 may be defined to include a partial area of the entire display area of the display device 300 that is obscured from the operator's front view when the front work apparatus (at least portions of the boom and the bucket) encroaches. For example, the transparency processing area may be determined to have a size approximately equal to a width of the wheel loader or a width in a horizontal direction of the bucket when the wheel loader is driven forward.

The transparency processing may be performed by removing the first image or the second image within the transparency processing area of the synthesized image or making the first image or the second image semi-transparent within the transparency processing area of the synthesized image so that it overlaps with the background image, or by two-dimensionally displaying the outline of the appearance as a line or dotted line so that only the shape can be identified. For example, the first image or the second image within the transparency processing area may be removed from the synthesized image using an alpha blending technique, etc.

The image processor 240 may receive the warning information of the recognized object from the warning information determiner 226, and may perform labeling processing on the warning information of the recognized object in the transparency-processed synthesized image. The image processor 240 may label the warning information in the synthesized image using a bounding box, box shading, or other notation on the recognized object. In addition, the image processor 240 may label the warning information by blinking the bounding box or using an oval-shaped bar at a bottom of the object.

In example embodiments, when the recognized object is positioned outside the first region R1 in the first image IM1, the image processor 240 may reflect the warning information of the first label OL1 to display the recognized object using a bounding box of a first color (e.g., blue) in the synthesized image. When the recognized object is positioned within the second region R2 of the second image IM2, the image processor 240 may reflect the warning information of the second label OL2 to display the recognized object as a bounding box of a second color (e.g., red) in the synthesized image. At this time, the second color (red) may inform the operator that a more dangerous situation is likely to occur than the first color (blue). In addition, in such a situation where the possibility of dangerous occurrence is high, the image processor 240 may synthesize a red image within the transparency processing area R3 of the synthesized image or perform blinking processing so that the red image blinks.

As illustrated in FIGS. 6 to 8, the image processor 240 may crop a portion of the second image IM2 based on the first image IM1 and then synthesize the cropped image of the second image IM2 into the first image IM1.

In particular, first, the first region R1 in the first image IM1 corresponding to the transparency processing area R3 may be transparency-processed to have a first transparency. The second region R2 in the second image IM2 corresponding to the transparency processing area R3 may be determined as a crop region and the determined second region may be transparency-processed to have a second transparency. The first transparency and the second transparency may be set to be the same or different from each other. The first and second transparencies may be adjusted to, for example, a level of 150/255 to 230/255. At this time, the transparency of the cropped image extracted from the second image may not be adjusted. Then, the cropped image extracted from the second image IM2 may be synthesized into the transparent processing region R3 of the first image IM1. At this time, if an area of the cropped region is smaller than an area of the first region R1 of the first image, the cropped image may be enlarged and the enlarged cropped image may be synthesized into the first region R1 of the first image.

If there is a car in front of the wheel loader, the car cannot be accurately identified in the first image of FIG. 6 because it is obscured by a boom or bucket, but the car can be identified in the second image of FIG. 7. The cropped image extracted from the second image of FIG. 7 may include an image of the car. Since the cropped image is synthesized into the first region R1 of the first image corresponding to the transparency processing area, the image of the car extracted from FIG. 7 may be identified in the transparency processing area R3 of the synthesized image of FIG. 8. Accordingly, the operator's front view limited by the work apparatus may be improved.

In addition, the object recognizer 220 may recognize objects in the first image IM1 and the second image IM2 and may determine warning information of the recognized object. The image processor 240 may label the warning information of the recognized object in the transparency-processed synthesized image.

As illustrated in FIG. 6, the object recognizer 220 may recognize an excavator in the first image IM1, and if the recognized excavator is positioned outside the first region R1 in the first image IM1, the object recognizer 220 may determine warning information for the recognized excavator as the first label OL1.

As illustrated in FIG. 7, the object recognizer 220 may recognize an automobile in the second image IM2, and if the recognized automobile is positioned within the second region R2 in the second image IM2, the object recognizer 220 may determine warning information for the recognized automobile as the second label OL2.

As illustrated in FIG. 8, the image processor 240 may display the recognized excavator as a blue bounding box (A) in the synthesized image, and may display the recognized automobile as a red bounding box (B). In addition, in situations where there is a high possibility of collision, the image processor 240 may synthesize a red image within the transparency processing area R3 in the synthesized image or perform blinking processing so that the red image blinks.

Accordingly, the operator may recognize that there is an object with a high possibility of collision in front of the wheel loader through the red bounding box (B) or the red image blinking within the transparency processing area R3.

In example embodiments, the image processor 240 may set the position of the transparent processing area R3 in the synthesized image according to a refraction angle information of the front body obtained from the steering angle determiner 230. The image processor 240 may adjust the position of the transparent processing area R3 according to the steering hinge angle θs of the front body calculated by the steering angle determiner 230.

The position of the transparency processing area may be adjusted to follow the determined steering hinge angle. As the stroke of the steering cylinder changes by the steering device, the front body 12 may be refracted to the left (or right), and at this time, the front work apparatus including the boom 20 and the bucket 30 may deviate from the initially set transparent processing area, thereby obscuring the front view of the operator. The steering angle determiner 230 may recognize the shape of the front body 12 refracted to the left (or right) and may calculate the steering hinge angle of the front body from the recognized shape. The image processor 240 may automatically change the position of the transparent processing area to follow the determined steering hinge angle.

In FIG. 3, when the construction machine turns left (or right), the transparency processing area R3 may be moved to the left (or right) of the screen of the display device 300 according to the refraction angle information of the front body determined by the steering angle determiner 230. In this case, the position of the transparency processing area R3 may be moved to the left (or right) according to the refraction angle information, and at least one of the first image and the second image may be transparency-processed in the moved transparent processing area R3.

In example embodiments, the work apparatus posture detection portion may detect whether the work apparatus invades the transparency processing area R3 in the display area of the display device 300. The image processor 240 may perform transparency processing based on a posture of the front working apparatus detected by the work apparatus posture detection portion in response to a case in which at least a portion of the work apparatus invades a position corresponding to the transparency processing area.

The posture of the work apparatus may include a position of the bucket 30 (a height of the bucket from the ground) or a posture of the boom 20 (a rotational angle of the boom). To this end, the work apparatus posture detection portion may include a boom angle sensor 24 for detecting the position of the bucket 30 or the posture of the boom 20. In addition, the work apparatus posture detection portion may include a bucket angle sensor (not illustrated) for detecting a relative rotational angle between the boom 20 and the bucket 30. The work apparatus posture detection portion may include a displacement sensor for detecting a stroke of the cylinder driving the boom 20, in place of the boom angle sensor 24.

Further, the work apparatus posture detection portion may include an image analysis device (for example, shape recognizer) that analyzes an image of the work apparatus captured through the camera portion to determine the posture of the work apparatus.

The boom angle sensor 24 may detect the rotational angle of the boom 20 and may provide information on the position of the bucket 30 based on the rotational angle of the boom 20. As illustrated in FIG. 2, the rotational angle of the boom 20 may be an angle θ between an extension line L at the lowest position (0%) of the boom 20 (bucket 30) and an extension line R at an elevated position of the boom 20. The rotational angle of the boom 20 at the highest position of the boom 20 (max boom height) is θmax.height, and in this case, the boom (bucket) position may be the maximum height (100%).

The image processor 240 may receive the rotational angle detection value of the boom and may determine a first transparency in the first region R1 of the first image IM1 and a second transparency in the second region R2 of the second image M2 based on the detection value.

For example, the image processor 240 may transparency-process the second image to be transparent in the synthesized image when it is determined that the bucket or boom position is lower than a predetermined position (transparency switching position), which can be determined that the at least a portion of the work apparatus does not invade the transparency processing area. On the other hand, the image processor 230 may transparency-process the first image to be transparent in the synthesized image when it is determined that the bucket or boom position is higher than the predetermined position (transparency switching position), which can be determined that the at least a portion of the work apparatus invades the transparency processing area. The predetermined position of the boom may be set such that the rotational angle θ of the boom 20 is within a range of 15 degrees to 20 degrees.

When the bucket 30 is positioned between the lowest position (0%) and the predetermined bucket position, that is, the transparency switching position which is the boundary of the transparency processing area, the second image captured from the lower camera 120 may be transparency-processed, so that an object implemented by the upper camera 110 may be displayed as a main point (focus). In the second image captured from the lower camera 120, when the bucket 30 is in a relatively low position, the front view of the front body 12 may be obscured by the front work apparatus including the boom 20 and the bucket 30. The image processor 240 may process the second image to be transparent and display the first image as a focus to thereby prevent the front view from being obscured by the front work apparatus.

When the bucket 30 is lifted or lowered to pass through the predetermined bucket position (transparency switching position), an image located in the transparency processing area transparency-processed by the transparency processor 240 may be converted from the second image to the first image or from the first image to the second image.

Alternatively, the image processor 240 may transparency-process the second image in the synthesized image to be transparent when the rotational angle θ of the boom is within a first angle range, transparency-process the first and second images in the transparency processing area of the synthesized image to be transparent when the rotational angle θ of the boom is within a second angle range, and transparency-process the first image in the synthesized image to be transparent when the rotational angle θ of the boom is within a third angle range. For example, the first angle range may be within 0 degree to 15 degrees, the second angle range may be within 15 degrees to 25 degrees, and the third angle range may be within 25 degrees to 45 degrees.

In example embodiments, an image processing condition in the image processing device 200 may be set through an input portion 400. For example, the image processing condition may include a location, a size, etc. of the transparency processing area. As the transparency processing area is determined, the transparency switching position of the first and second images, the transparency processing area in the entire display area of the display device 300, and the like may be set. For example, the transparency switching position may represent a boundary position of the transparency processing area, and when the bucket 30 moves to be located at the boundary of the transparency processing area, the bucket 30 may be considered to be located at a predetermined position for transparency switching. The size and location of the transparency processing area, the transparency switching timing, etc. may be fixedly set by a manufacturer according to a type of equipment, and may be freely changed and set by the operator or maintenance personnel.

For example, the input portion 400 may be implemented in a form of an instrument panel option, and the operator may change the timing point for the transparency switching, the area to be processed for transparency, and the like through the input portion 400.

As mentioned above, when the transparency processing area and the transparency switching point are set, the display device 300 may display an image by dividing the image captured by the camera portion into the transparency processing area R3 and an external area of the transparency processing area R3. The display device 300 may additionally display an outline of the transparency processing area R3 such that the transparency processing area R3 can be distinguished, or may not display the outline of the transparency processing area and may display the transparency-processed image to be connected to an image of the external area of the transparency processing area R3.

Additionally, the display device 300 may display the first image in the external area of the transparency processing area R3, and may display a transparency-processed image in which at least one of the first image and the second image is displayed as a focus according to the progress of the transparency processing within the transparency processing area R3.

For example, when the bucket 30 is located in the external area of the transparency processing area R3, the display device 300 may display only the first image that interconnects the transparency processing area R3 and the external area of the transparency processing area R3. Additionally, when at least a portion of the bucket 30 is located within the transparency processing area R3, the display device 300 may display a transparency-processed image in which the second image is displayed as a focus or the second image within the transparency processing area R3, and may display the first image in which only the image within the transparency processing area R3 is excluded, in the external area of the transparency processing area R3.

Hereinafter, a method of controlling construction machinery using the control system for construction machinery in FIG. 4 will be explained. The following description will also be described based on the wheel loader as in the above-described system.

Figure 9:
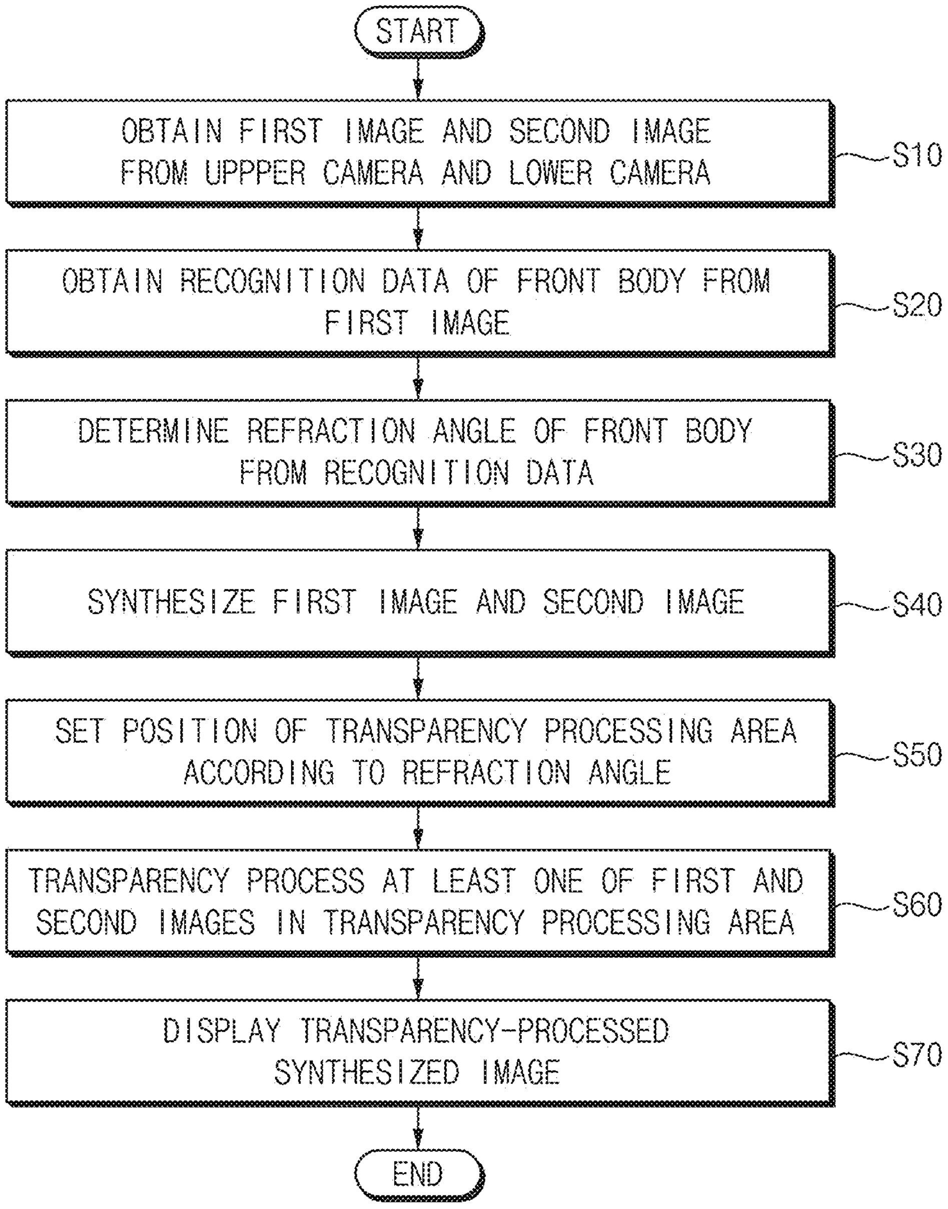
FIG. 9 is a flow chart illustrating a method of controlling a wheel loader in accordance with example embodiments.
Figure 10:
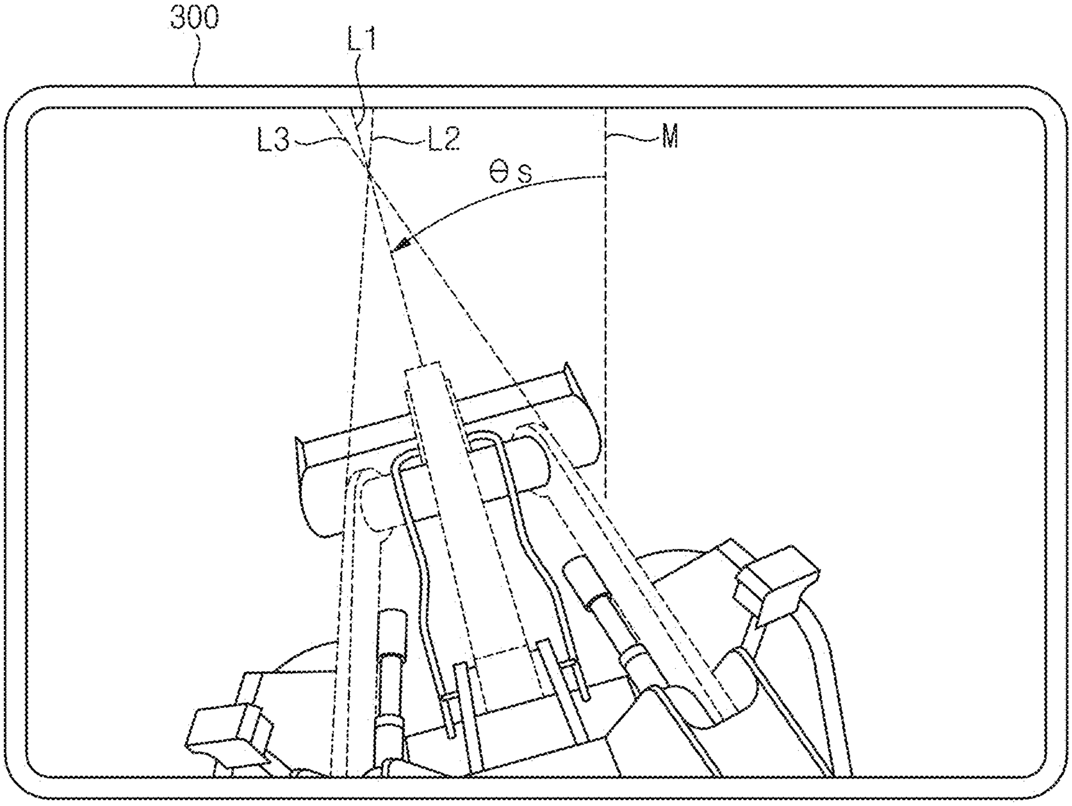
FIG. 10 is a view illustrating a step of determining a steering hinge angle by recognizing a shape of a boom in a first image captured by an upper camera when construction machine turns left (LT state) in FIG. 3.
Figure 11:
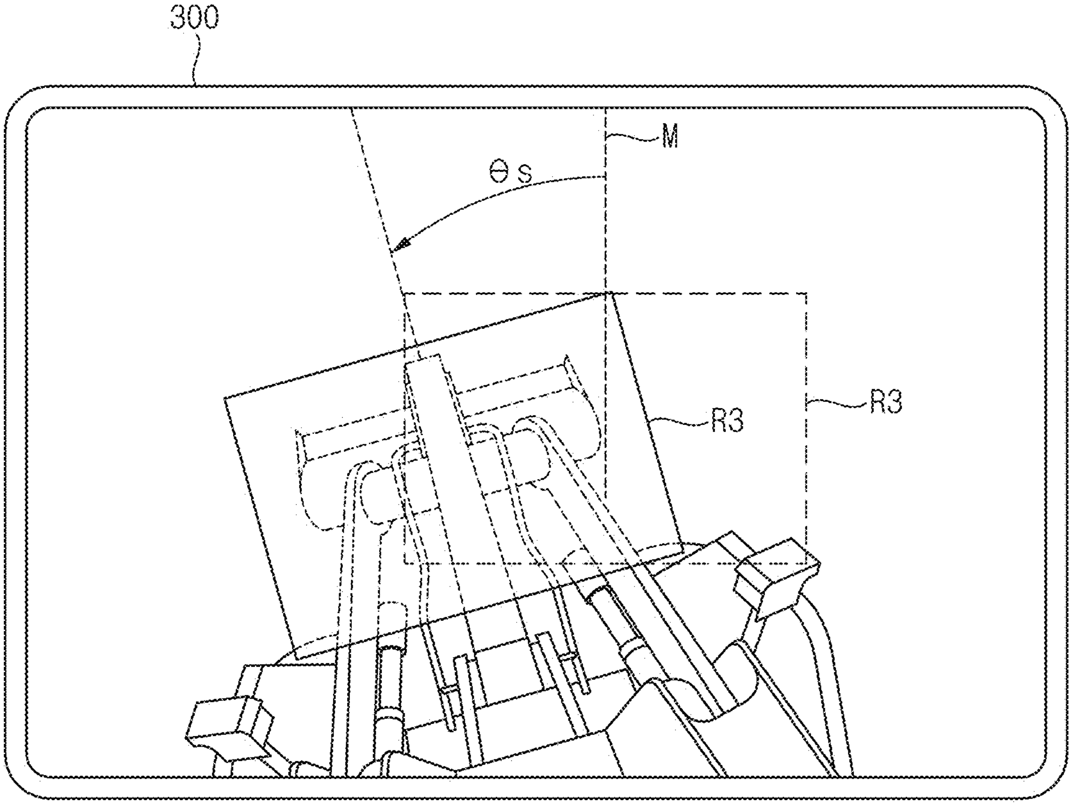
FIG. 11 is a view illustrating a step of adjusting a position of a transparency processing area according to the steering hinge angle determined in FIG. 10.

FIG. 9 is a flow chart illustrating a method of controlling a wheel loader in accordance with example embodiments. FIG. 10 is a view illustrating a step of determining a steering hinge angle by recognizing a shape of a boom in a first image captured by an upper camera when construction machine turns left (LT state) in FIG. 3. FIG. 11 is a view illustrating a step of adjusting a position of a transparency processing area according to the steering hinge angle determined in FIG. 10.

Referring to FIGS. 1 to 11, first, a first image IM1 and a second image IM2 captured respectively through an upper camera 110 and a lower camera 120 installed in a wheel loader 10 may be obtained (S10), recognition data of a front body 12 may be obtained from the first image IM1 (S20), and a steering hinge angle of the front body 12 may be determined from the recognition data (S30). Then, the first image IM1 and the second image IM2 may be synthesized into one image (S40), and a position of a transparency processing area R3 may be set according to the steering hinge angle information (S50).

In example embodiments, the first image IM1 for the front of a driver cabin 40 may be obtained using the first camera 110 installed on the driver cabin 40. The second image IM2 for the front of a front body 12 may be obtained using the second camera 120 installed in the front body 12.

The first image may be an image captured with a focus on a front upper region through the upper camera 110, and the second image may be an image captured with a focus on a front lower region through the second camera 120. A first vertical viewing angle θv1 of the upper camera 110 and a second vertical viewing angle θv2 of the lower camera 120 may be set to partially overlap and a first horizontal viewing angle θh1 of the upper camera 110 and a second horizontal viewing angle θh2 of the lower camera 120 may be set to partially overlap, so that the first image and the second image may partially overlap each other.

For example, the upper camera 110 may be installed to coincide with a central axis (or pivotal axis) of the center pin 16 or be installed in the rear of the central axis, and the lower camera 120 may be installed in the front of the central axis of the center pin 16. Since the upper camera 110 and the lower camera 120 are installed at different positions with respect to the pivotal central axis, as illustrated in FIG. 3, a direction in which the upper camera 110 looks and a direction in which the lower camera 120 looks may be changed to be different from each other when the wheel loader turns left (or right).

Example embodiments, the steering angle determiner 230 may recognize a front body 12 as an object based on the first image IM1 obtained from the upper camera 110 to determine a steering hinge angle θs of the front body 12. The image processor 240 may synthesize the first image IM1 and the second image IM2 into one image. The image processor 240 may set a position of the transparent processing area in the synthesized image according to the refraction angle information of the front body obtained from the steering angle determiner 230.

When the front body 12 is refracted to the left by a steering device, the front work apparatus including a boom 20 and a bucket 30 may go beyond the initially set transparent processing area, thereby obscuring the front view of the operator. At this time, the steering angle determiner 230 may recognize the shape of an attachment (boom 20 or bucket 30) of the front body 12 in the first image IM1 through a pre-determined algorithm and may calculate the steering hinge angle of the front body from the recognized shape.

As illustrated in FIG. 10, when the construction machine is steered to the left (LT state), the steering angle determiner 230 may extract a shape of the boom 20 of the front body 12 from the first image IM1 through an edge algorithm, and may apply Hough transform to the extracted shape of the boom to recognize intersection angles of lines (L1, L2, L3) extending from a center portion, a left edge, and a right edge of the boom 20, and to calculate the steering hinge angle of the front body from the recognized intersection angles.

As illustrated in FIG. 11, the image processor 240 may automatically change the position of the transparent processing area to follow the steering hinge angle determined by the steering angle determiner 230.

Then, at least one of the first image and the second image in the transparency processing area R3 may be transparency-processed (S60), and the transparency-processed synthesized image may be displayed through a display device 300 (S70).

In example embodiments, the image processor 240 may synthesize the first image IM1 and the second image IM2 from first and second image data received from the image data receiver 210 into one image. The image processor 240 may match the first image and the second image captured by the upper camera 110 and the lower camera 120 to find portions of images that overlap in the first and second images and synthesize the overlapping portions of the images to one synthesized image. The image processor 240 may perform transparency processing on at least one of the first and second images in the synthesized image to be transparent in the transparency processing area R3.

The transparency processing may be performed by removing the first image or the second image within the transparency processing area of the synthesized image or making the first image or the second image semi-transparent within the transparency processing area of the synthesized image so that it overlaps with the background image, or by two-dimensionally displaying the outline of the appearance as a line or dotted line so that only the shape can be identified. For example, the first image or the second image within the transparency processing area may be removed from the synthesized image using an alpha blending technique, etc.

In example embodiments, transparency processing may be performed based on a posture of a front working apparatus in response to a case in which at least a portion of the work apparatus invades a position corresponding to the transparency processing area.

For example, the transparency processor 240 may transparency-process the second image to be transparent in the synthesized image when it is determined that the bucket or boom position is lower than a predetermined position (transparency switching position), which can be determined that the at least a portion of the work apparatus does not invade the transparency processing area. On the other hand, the image processor 240 may transparency-process the first image to be transparent in the synthesized image when it is determined that the bucket or boom position is higher than the predetermined position (transparency switching position), which can be determined that the at least a portion of the work apparatus invades the transparency processing area. The predetermined position of the boom may be set such that the rotational angle θ of the boom 20 is within a range of 15 degrees to 20 degrees.

In example embodiments, an image processing condition for transparency-processing the first and second images may be set. The image processing condition in the image processing device 200 may be set through an input portion 400. For example, the image processing condition may include a transparency switching timing of the first and second images, an area occupied by the transparency processing area of the entire display area of a display device 300, etc. The transparency switching timing of the first and second images may be determined based on the position of the bucket 30 or the bucket 20 and the predetermined bucket or boom position. The transparency processing area may be selected according to a type of equipment.

For example, the input unit 400 may be implemented in a form of an instrument panel option, and the operator may change the timing point for the transparency switching, the area to be processed for transparency, and the like through the input unit 400. The input unit 400 may be provided in a form of a separate manipulation device provided in the driver cabin, a manipulation device integrally provided with the display device, or a touch screen constituting a display screen of the display device. Thus, the operator may set various image processing conditions such as setting a periphery of the object requiring attention during work as the transparency processing area.

As mentioned above, the first image and the second image captured from the upper camera 110 installed in the driver cabin 40 of the wheel loader 10 and the lower camera 120 installed in the front body 12 may be synthesized into one image, at least one of the first and second images may be transparency-processed to be transparent in the synthesized image, and the transparency-processed image may be displayed through the display device 300.

In addition, since the upper camera 110 and the lower camera 120 are installed at positions different from each other, the bucket 30 may go out of the transparent processing area R3 not to align with it when steering to the left or right. When the wheel loader 10 is steered, the steering hinge angle of the front body 12 may be determined using only the camera image without a separate angle sensor or steering cylinder displacement sensor, and the image may be processed such that the position of the transparent processing area R3 in the image synthesized by the first image IM1 and the second image IM2 is aligned with the determined steering hinge angle.

Accordingly, even when the wheel loader 10 is steered, it may be possible to prevent the operator's front view from being blocked by the front work apparatus including the boom 20 and the bucket 30. Thus, the operator's cognitive ability may be increased to secure stability, to thereby prevent safety accidents in advance.

The present invention has been explained with reference to preferable embodiments, however, those skilled in the art may understand that the present invention may be modified or changed without being deviated from the concept and the scope of the present invention disclosed in the following claims.

<The description of the reference numerals>

| | |
|---|---|
| 10: wheel loader | 12: front body |
| 14: rear body | 20: boom |
| 22: boom cylinder | 24: boom angle sensor |
| 30: bucket | 32: bucket cylinder |
| 34: tilt arm | 40: driver cabin |
| 70: front wheel | 100: camera portion |
| 110: first camera | 120: second camera |
| 150: angle information detection portion | 200: image processing device |
| 210: image data receiver | 212: first data receiver |
| 214: second data receiver | 220: object recognizer |
| 222: first shape recognizer | 224: second shape recognizer |
| 226: warning information determiner | 230: steering angle determiner |
| 240: image processor | 300: display device |
| 400: input portion | |

The invention claimed is:

1. A method of controlling construction machinery, the method comprising:

obtaining a first image of the front of a driver cabin from an upper camera installed in the driver cabin of a rear body;

obtaining a second image of the front of a front body from a lower camera installed in the front body rotatably connected to the rear body;

recognizing a shape of the front body in the first image to determine a refraction angle of the front body;

synthesizing the first and second images into one synthesized image;

setting a position of a transparency processing area in the synthesized image according to the refraction angle of the front body;

transparency-processing at least one of the first and second images in the transparency processing area of the synthesized image; and displaying the transparency-processed image through a display device, wherein recognizing the shape of the front body in the first image to determine the refraction angle of the front body includes:

extracting a shape of a boom of the front body from the first image through an edge algorithm; and applying Hough Transform to the extracted shape of the boom to calculate a steering hinge angle of the front body.

2. The method of claim 1, wherein recognizing the shape of the front body in the first image to determine the refraction angle of the front body includes:

recognizing a shape of an attachment of the front body in the first image through a pre-determined algorithm; and calculating the steering hinge angle of the front body from the recognized shape, and wherein the attachment includes the boom, and the pre-determined algorithm includes the edge algorithm.

3. The method of claim 1, wherein transparency-processing the at least one of the first and second images includes cropping a portion of the second image based on the first image and synthesizing the cropped image of the second image into the first image.

4. The method of claim 1, wherein transparency-processing the at least one of the first and second images includes:

transparency-processing a first region in the first image corresponding to the transparency processing area to have a first transparency;

determining a second region in the second image corresponding to the transparency processing area as a crop region and transparency-processing the determined second region to have a second transparency; and synthesizing the cropped image extracted from the second image into the first image.

5. The method of claim 1, further comprising detecting a posture of a front work apparatus, wherein transparency-processing the at least one of the first and second images includes transparency-processing the at least one of the first and second images according to the detected posture of the front work apparatus.

6. The method of claim 1, further comprising:

setting an image processing condition to make the first and second images transparent.

7. The method of claim 6, wherein the image processing condition includes a transparency processing switching timing of the first and second images or an area occupied by the transparent processing area within the entire display area of the display device.

8. A control system for construction machinery, the control system comprising:

an upper camera installed in a driver cabin of a rear body to capture a front view of the driver cabin;

a lower camera installed in a front body rotatably connected to the rear body to capture a front view of the front body;

a steering angle determiner configured to recognize a shape of the front body in the first image captured from the upper camera and to determine a refraction angle of the front body;

an image processor configured to synthesize the first and second images into one synthesized image, and to set a position of a transparency processing area in which at least one of the first and second images is transparency-processed in the synthesized image according to the refraction angle of the front body determined by the steering angle determiner; and a display device configured to display the synthesized image transparency-processed by the image processing device, wherein the steering angle determiner is configured to extract a shape of a boom of the front body from the first image through an edge algorithm, and to apply Hough Transform to the extracted shape of the boom to calculate the steering hinge angle of the front body.

9. The control system for construction machinery of claim 8, wherein the steering angle determiner is configured to recognize a shape of an attachment of the front body in the first image through a pre-determined algorithm and to calculate a steering hinge angle of the front body.

10. The control system for construction machinery of claim 8, wherein the image processor is configured to crop a portion of the second image based on the first image and to synthesize the cropped image of the second image into the first image.

11. The control system for construction machinery of claim 8, wherein the image processor is configured to:

transparency-process a first region in the first image corresponding to the transparency processing area to have a first transparency;

determine a second region in the second image corresponding to the transparency processing area as a crop region, and transparency-process the determined second region to have a second transparency; and synthesize the cropped image extracted from the second image into the first image.

12. The control system for construction machinery of claim 11, wherein the first transparency and the second transparency are set to be the same or different from each other.

13. The control system for construction machinery of claim 8, wherein the image processor is configured to set a portion of the first image as a first synthesizing region, set a portion of the second image as a second synthesizing region, process the second synthesizing region of the second image to be semi-transparent, and synthesize the semi-transparent second synthesizing region into the first synthesizing region of the first image to create the synthesized image.

14. The control system for construction machinery of claim 8, further comprising a work apparatus posture detection portion configured to detect a posture of a front work apparatus, wherein the image processor is configured to transparency-process at least one of the first and second images to be transparent in the transparency processing area according to the posture of the front work apparatus detected by the work apparatus posture detection portion.

15. The control system for construction machinery of claim 14, wherein the image processor is configured to transparency-process the first image to be transparent in the transparency processing area when at least a portion of the front working apparatus encroaches on a predetermined position, and to transparency-process the second image transparent in the transparency processing area when the front working apparatus does not encroach on the predetermined position.

16. The control system for construction machinery of claim 8, further comprising an input portion configured to set an image processing condition in the image processor.

17. The control system for construction machinery of claim 16, wherein the image processing condition includes a transparency processing switching timing of the first and second images or an area occupied by the transparency processing area within the entire display area of the display device.

18. The control system for construction machinery of claim 8, wherein the image processor is configured to process an outline of an appearance of the boom or a bucket that is captured and transparency-processed in the first image or the second image in the transparency processing area to be displayed as a line or a dotted line.

* * * * *